(12) United States Patent
Linhart et al.

(10) Patent No.: US 8,099,830 B2
(45) Date of Patent: *Jan. 24, 2012

(54) HANDLE ARRANGEMENT ON A VACUUM CLEANER HOSE

(75) Inventors: Georg Peter Linhart, Wöllstadt (DE); Christian Norbert Linhart, Langgöns (DE)

(73) Assignee: Truplast Kunststofftechnik GmbH, Langgöns (DE)

( * ) Notice: Subject to any disclaimer, the term of this patent is extended or adjusted under 35 U.S.C. 154(b) by 686 days.

This patent is subject to a terminal disclaimer.

(21) Appl. No.: 12/220,121

(22) Filed: Jul. 22, 2008

(65) Prior Publication Data

US 2009/0031526 A1 Feb. 5, 2009

(30) Foreign Application Priority Data

Aug. 2, 2007 (DE) .................. 10 2007 036 341

(51) Int. Cl.
*A47L 9/00* (2006.01)
*H01R 4/60* (2006.01)
*H01R 4/64* (2006.01)
*H01R 39/00* (2006.01)
(52) U.S. Cl. .............. 15/410; 439/194; 439/13
(58) Field of Classification Search ............ 15/410; 439/191, 192, 194, 13
See application file for complete search history.

(56) References Cited

U.S. PATENT DOCUMENTS

| 5,109,568 A | * | 5/1992 | Rohn et al. ............. 15/410 |
| 5,216,778 A | | 6/1993 | Suzuki et al. |
| 5,387,117 A | * | 2/1995 | Moyher et al. ........ 439/191 |
| 5,389,004 A | | 2/1995 | Gray et al. |
| 5,400,462 A | * | 3/1995 | Amoretti ............... 15/321 |
| 6,722,904 B2 | * | 4/2004 | Linhart ................ 439/191 |
| 6,733,315 B2 | * | 5/2004 | Linhart ................ 439/191 |
| 7,805,806 B2 | * | 10/2010 | Linhart et al. ......... 15/410 |

FOREIGN PATENT DOCUMENTS

| EP | 0 727 173 A1 | 8/1996 |
| EP | 0 884 019 A1 | 12/1998 |
| JP | 7067817 A | 3/1995 |

OTHER PUBLICATIONS

EPO Search Report for EP 08 01 3807—dated Oct. 15, 2010—2 pages.

* cited by examiner

*Primary Examiner* — Bryan R Muller
(74) *Attorney, Agent, or Firm* — Reising Ethington, P.C.

(57) ABSTRACT

A handle arrangement on a vacuum cleaner hose has an inner bushing non-rotatably attached to one end of the hose and is inserted in a handle tube and axially fixed therein such that it can rotate. Electrical leads are guided outwards from the hose and the inner bushing in a radial direction through a wall opening of the handle tube and into the cavity of a handle part. The handle part is firmly connected at both ends to the handle tube. The electrical leads are fixed so as to form a length reserve loop in the cavity. A receiving space is provided on the inner bushing, into which electrical leads from the length reserve loop are shifted when relative rotations take place between the hose and the handle tube. The possible rotation angle is delimited by stops according to the lead length available in the length reserve loop.

9 Claims, 6 Drawing Sheets

FIG.7

HANDLE ARRANGEMENT ON A VACUUM CLEANER HOSE

TECHNICAL FIELD

The invention relates to a handle arrangement on a vacuum cleaner hose. In such arrangements, the hose and the handle arrangement can rotate relative to one another in order to allow and facilitate handling of the vacuum cleaner.

PRIOR ART

In a known handle arrangement for a vacuum cleaner hose as illustrated in U.S. Pat. No. 5,389,004, the electrical connection between electrical leads of the hose and electrical leads of the handle arrangement is established by slip rings fitted on the outer circumference of the inner bushing of the hose and slip ring contacts fitted on the handle arrangement. This design allows free rotation of the handle arrangement about the inner bushing of the hose through 360°, but the fitting of slip rings and slip ring contacts requires considerable manufacturing complexity since slip ring arrangements require very precise manufacture in order to ensure that the slip rings and slip ring contacts are permanently kept in contact for power conduction purposes. Furthermore, soiling of the contact surfaces has to be avoided, which may be difficult in an atmosphere that is not free of dust.

Slip rings are also used on another known vacuum cleaner hose with electrical leads as exemplified by EP 0 884 019 B1.

What is needed is a handle arrangement of the type described above, which requires a relatively low manufacturing complexity and allows a permanently disruption-free electrical connection without slip rings and slip ring contacts.

SUMMARY OF THE INVENTION

Starting from the handle arrangement described in the introduction, the handle arrangement according to the invention is characterised in that the electrical leads are guided outwards from the hose and the inner bushing in an approximately radial direction through an opening of the handle tube and into the cavity of a handle part which is connected to the hose-side end of the handle tube, the electrical leads are fixed so as to form a length reserve loop in the handle part, a receiving space is provided on the outer circumference of the inner bushing, which receiving space is located opposite the opening of the handle tube and into which electrical leads from the length reserve loop can be shifted in the case of relative rotations between the hose and the handle tube, and the rotation angle between the hose and the handle tube is delimited by stops according to the lead length in the length reserve loop.

The invention starts from the observation that a rotation angle of 360° between the hose and the handle arrangement is not necessary in practice and that a rotation angle of approximately 180° for example is sufficient. This rotation angle can be achieved according to the invention without using slip ring arrangements. It has been found that a length reserve loop formed of the leads themselves and arranged in the specified manner is entirely sufficient for the specified rotation angle, wherein the electrical leads are arranged continuously without a contact point and without any interruption at the transition between hose and handle arrangement.

In the case of relative movements between the hose and the handle arrangement, the receiving space on the circumference of the inner bushing takes up the leads without any kinks. The leads are also returned to the length reserve loop without any kinks in the rest position, once the handle arrangement and hose have again reached their relative starting position. The stops, which are effective in both directions of rotation, prevent any overexpansion or stretching of the electrical leads, which even at the stop positions assume a curved position which favours the return to the rest position of the length reserve loop. Here, the electrical leads are supported at their fixing point in the handle part.

The handle part may be formed of two half-shells which at one side partially tightly surround the handle tube at its hose-side end and at the other side are also connected to the other end of the handle part, wherein the two half-shells form a cavity passing through the handle part, through which cavity the electrical leads are guided and are fixed in the vicinity of the handle tube by a cable holder. The handle tube and handle part assembly then form a one-piece handle arrangement which can rotate to a limited extent relative to the hose connected thereto. The handle tube, which in the region of the inserted inner bushing may be cylindrical and may be formed in an arc shape adjacent thereto, for example as a 90° arc.

Preferably, the wall opening of the handle tube is designed as a slot-shaped cutout which passes around approximately half the circumference of the handle tube and the end faces of which are arranged approximately diametrically opposite one another in the relative starting position of the handle arrangement and hose.

The receiving space for the electrical leads on the outer circumference of the inner bushing is advantageously designed in such a way that it is delimited in the axial direction by two spaced-apart flange-like annular protrusions of the inner bushing and is delimited in the radial directions towards the outside by the inner wall surface of the handle tube and towards the inside by the outer circumferential surface of the inner bushing.

In the case of a hose which has, in a manner known per se, corrugation peaks and corrugation troughs running helically around the outside in the manner of an outer thread, the rotationally fixed attachment of the inner bushing to the hose end advantageously takes place in such a way that the hose pushed onto the inner bushing is pressed against one annular protrusion by a threaded sleeve screwed onto the hose, which threaded sleeve engages over the annular protrusion and has a stop element pointing radially outwards. Here, the threaded sleeve has an inner threaded section which, in terms of dimensions and pitch, is adapted to the outer thread of the hose formed by the corrugation peaks and corrugation troughs.

In a further embodiment of the present handle arrangement, the stop element of the threaded sleeve, is located within the wall opening of the handle tube, wherein the two end faces of the wall opening are the stop faces for the stop element which delimit the rotation angle between the hose and the handle tube.

Advantageously, the electrical leads of the hose, before entering the inner bushing, are located in a tube which extends into the wall opening of the handle tube and is placed in a receiving channel of the inner bushing which extends in the axial direction and is integrally formed in the wall of the inner bushing so as to be open towards the outside.

For sealing between the inner bushing and the handle tube which can rotate to a limited extent relative thereto, it is provided that the inner bushing has at its end remote from the hose an annular step on which a lipped sealing ring is held, the sealing lip of which bears against the inner wall surface of the handle tube.

BRIEF DESCRIPTION OF THE DRAWINGS

Further details of the invention will be explained in more detail with reference to the drawings which show a preferred example of embodiment. In the drawings.

The drawings are shown to different scales in order to illustrate details and functional relationships.

DETAILED DESCRIPTION OF THE PREFERRED EMBODIMENT

Figures 1, 2:
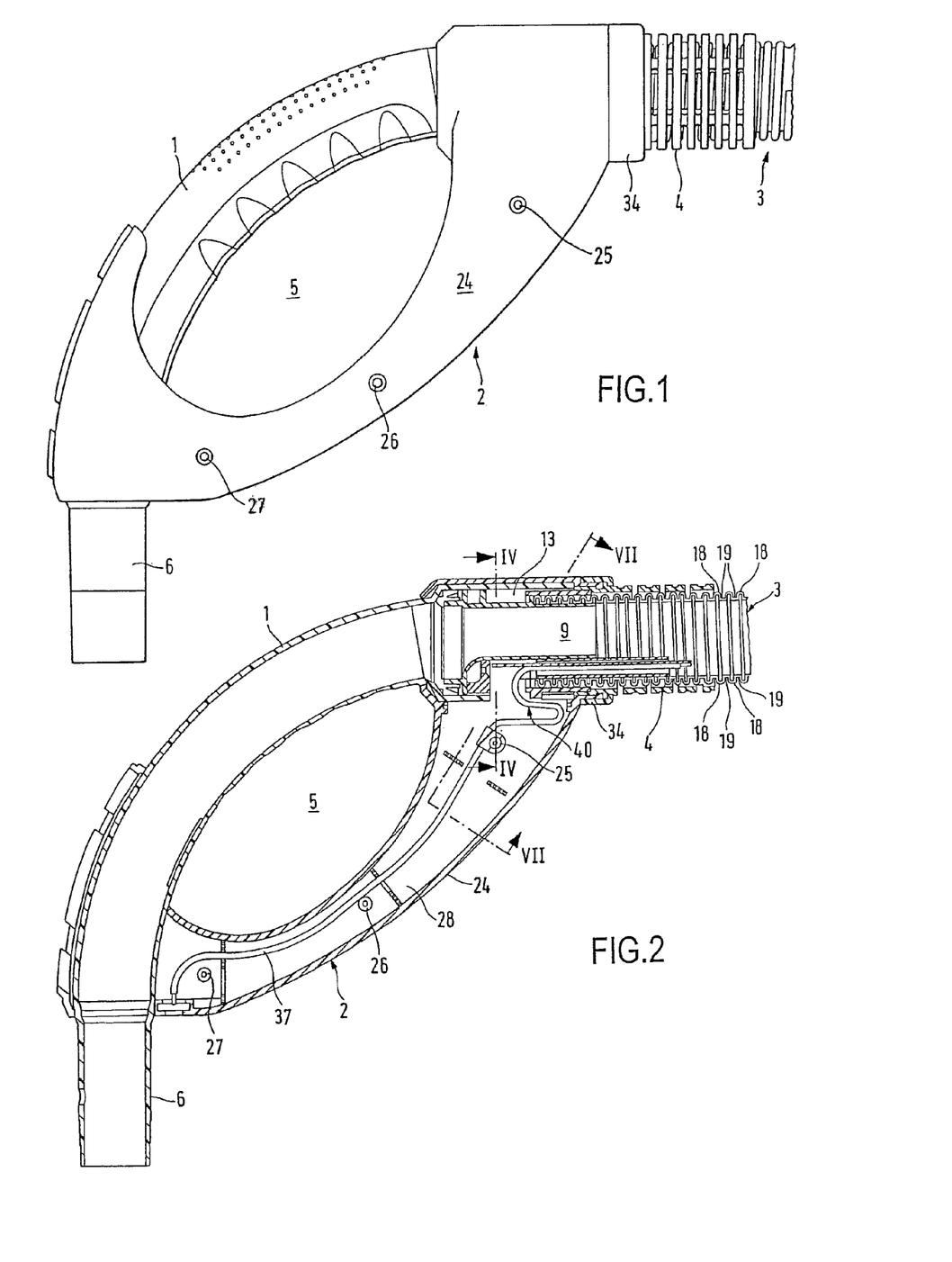
FIG. 1 shows a side view of the handle arrangement with the vacuum cleaner hose shown broken off.
FIG. 2 shows the arrangement according to FIG. 1, but in longitudinal section.

Of the handle arrangement, only a few parts can be seen from outside in FIG. 1, namely the handle tube 1, the handle part 2, the vacuum cleaner hose 3 and a cage-like anti-kink means 4 for the vacuum cleaner hose 3, the anti-kink means being connected to the handle arrangement. The handle tube 1 is designed in an arc shape as a handle and describes an arc of approximately 90°. The handle part 2 is also shaped as an arc, but opposite to the arc shape of the handle tube 1, so that a through-opening 5 is formed between the handle tube 1 and the handle part 2. The handle part 2 is at one side connected to the hose-side end of the handle tube 1 and at the other side is also connected to the other end of the handle tube 1, which merges into a connector 6 for a nozzle (not shown) or connection tube (not shown) to an electrically operated floor cleaning device or the like (not shown).

Figure 3:
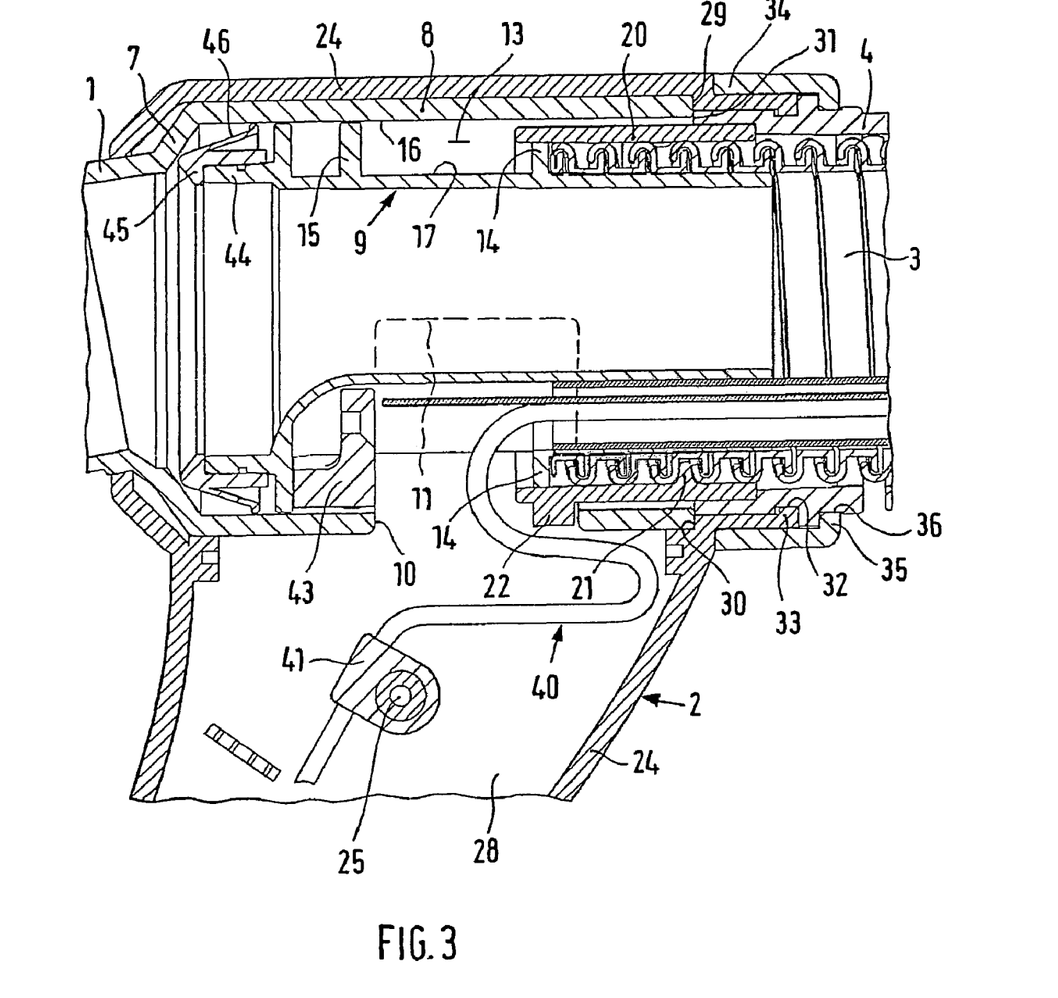
FIG. 3 shows a detail of the longitudinal section through the arrangement, shown on an enlarged scale compared to FIG. 2.
Figure 4:
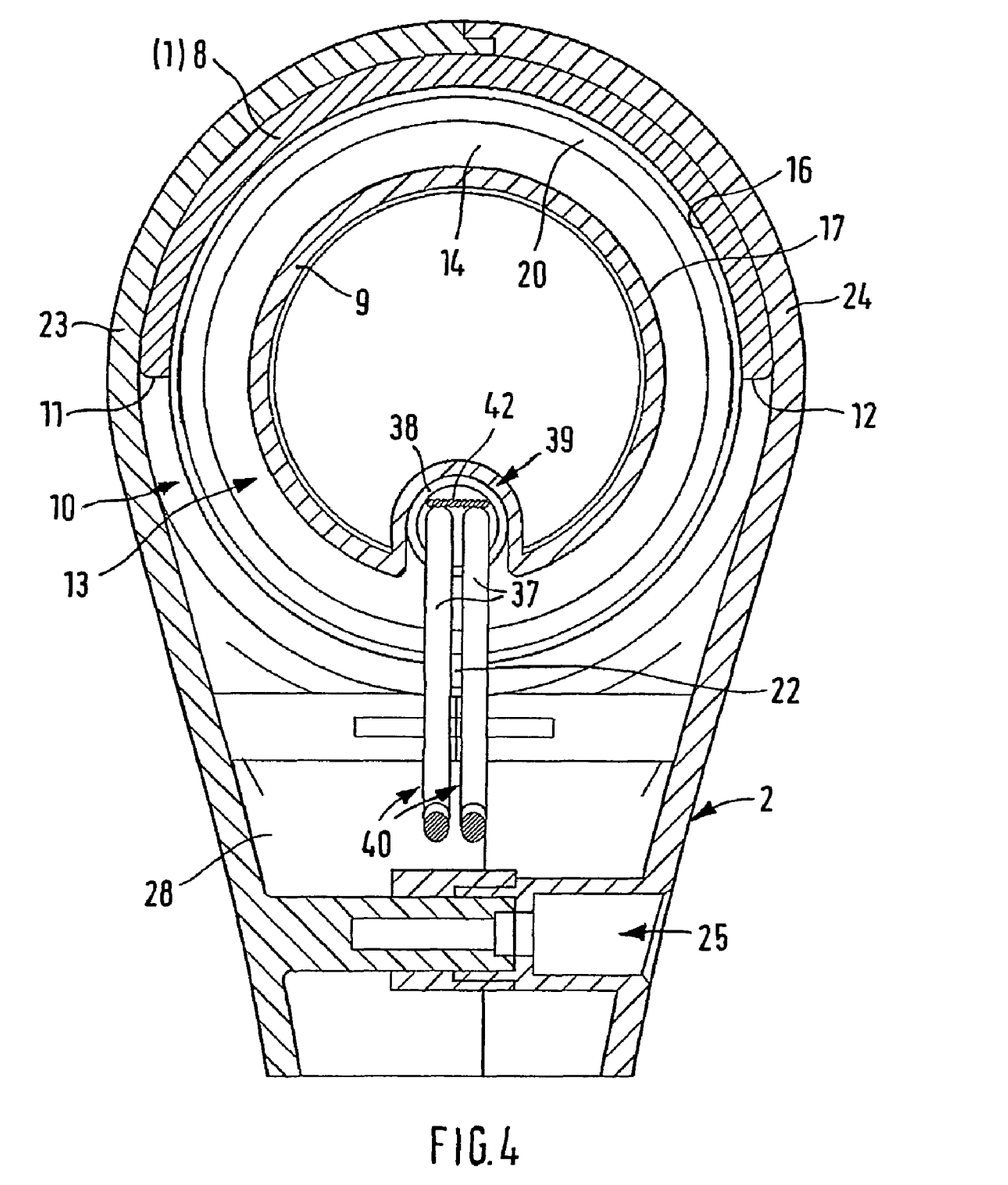
FIG. 4 shows the cross-section through the arrangement along the section line IV-IV in FIG. 2, showing the relative starting position of the inner bushing with respect to the handle tube.

As can be seen in particular from FIGS. 2 and 3, the handle tube 1 widens at a conical transition 7 to form a cylindrical end section 8 of larger diameter, in which the inner bushing 9 is inserted. Provided in the end section 8 of the handle tube 1 is a wall opening 10 which is designed as a wide slot-shaped cutout which passes around approximately half the circumference of the handle tube 1. The end faces 11 and 12 (FIGS. 3, 4) of the wall opening 10 are arranged approximately diametrically opposite one another in the relative starting position of the handle arrangement and hose 3 (FIG. 4).

Provided on the outer circumference of the inner bushing 9 is a receiving space 13 which is arranged opposite the wall opening 10 and is delimited in the axial direction by two spaced-apart flange-like annular protrusions 14 and 15 and is delimited in the radial directions towards the outside by the inner wall surface 16 of the cylindrical end section 8 of the handle tube 1 and towards the inside by the outer circumferential surface 17 of the inner bushing 9. The function of the receiving space 13 will be explained in more detail below.

The vacuum cleaner hose 3 has, in the conventional manner, alternating corrugation peaks 18 and corrugation troughs 19 running helically in the manner of an outer thread. The hose 3 is pushed onto the inner bushing 9 until it bears against the annular protrusion 14 and is pressed against the annular protrusion 14 by a threaded sleeve 20 screwed onto the hose 3, as a result of which the hose 3 is non-rotatably fixed to the inner bushing 9 so that the latter together with the hose 3 can rotate relative to the handle tube 1. The threaded sleeve 20 has for example a complete inner thread 21 which has the same pitch as the outer thread on the hose 3 formed by the corrugation peaks 18 and corrugation troughs 19, and is shown in section in FIG. 3.

The threaded sleeve 20 engages over the annular protrusion 14 and has on its outer circumferential surface a stop element 22 pointing radially outwards, which stop element is located within the wall opening 10 as shown in FIG. 3. The two end faces 11 and 12 of the wall opening 10 form the stop faces for the stop element 22 which delimit the possible rotation angle between the inner bushing 9 and the handle tube 1.

The handle part 2 is formed of two half-shells 23 and 24 which partially tightly surround the handle tube 1 and its cylindrical end section 8, as shown in FIGS. 2 to 7. The half-shells 23, 24 are also connected to the other end of the handle part 1 (FIGS. 1, 2), are firmly connected to one another at fixing points 25 to 27 and form a cavity 28 passing through the handle part 2.

As shown in FIG. 3, the two half-shells 23, 24, of which only the half-shell 24 can be seen in this figure, bear with an annular step 29 against the end face 30 of the cylindrical section 8 of the handle tube 1. The anti-kink means 4 also bears against the end face 30 with its inner end 31 which engages over the threaded sleeve 20. Located in the anti-kink means 4 is a circumferential groove 32, in which there engages a protrusion 33 located around the circumference of the two half-shells 23, 24. A latching ring 34 is pushed onto the hose-side end of the two half-shells 23, 24 and latches with a radially inwardly directed protrusion 35 into an associated groove 36 on the circumference of the anti-kink means 4.

Due to this design and arrangement of the engaging parts of the handle arrangement, the inner bushing 9, the hose 3, the anti-kink means 4 and the threaded sleeve 20 are arranged such that they can rotate together relative to the handle tube 1 with its cylindrical end section 8, the handle part 2 and the latching ring 34. However, the inner bushing 9 with the hose 3, the anti-kink means 4 and the threaded sleeve 20 are fixed such that they cannot be displaced in the axial direction with respect to the handle tube 1, the handle part 2 and the latching ring 34.

Guided through the hose 3 are electrical leads 37 which, before entering the inner bushing 9, are located in a tube 38 which extends into the wall opening 10 of the cylindrical end section 8 of the handle tube 1, as can be seen in particular in FIG. 3. The tube 38 is placed in a receiving channel 39 of the inner bushing 9 which extends in the axial direction and is integrally formed in the wall of the inner bushing 9 so as to be open towards the outside.

The electrical leads 37 are guided outwards from the hose 3 and the inner bushing 9, more specifically from the tube 38 placed in the receiving channel 39 of the inner bushing 9, in an approximately radial direction through the wall opening 10 of the handle tube 1, more specifically the cylindrical end section 8 of the handle tube 1, and into the cavity 28 of the handle part 2 and are fixed there by a cable holder 41 so as to form an approximately S-shaped length reserve loop 40, said cable holder being arranged at the fixing point 25.

Figure 5:
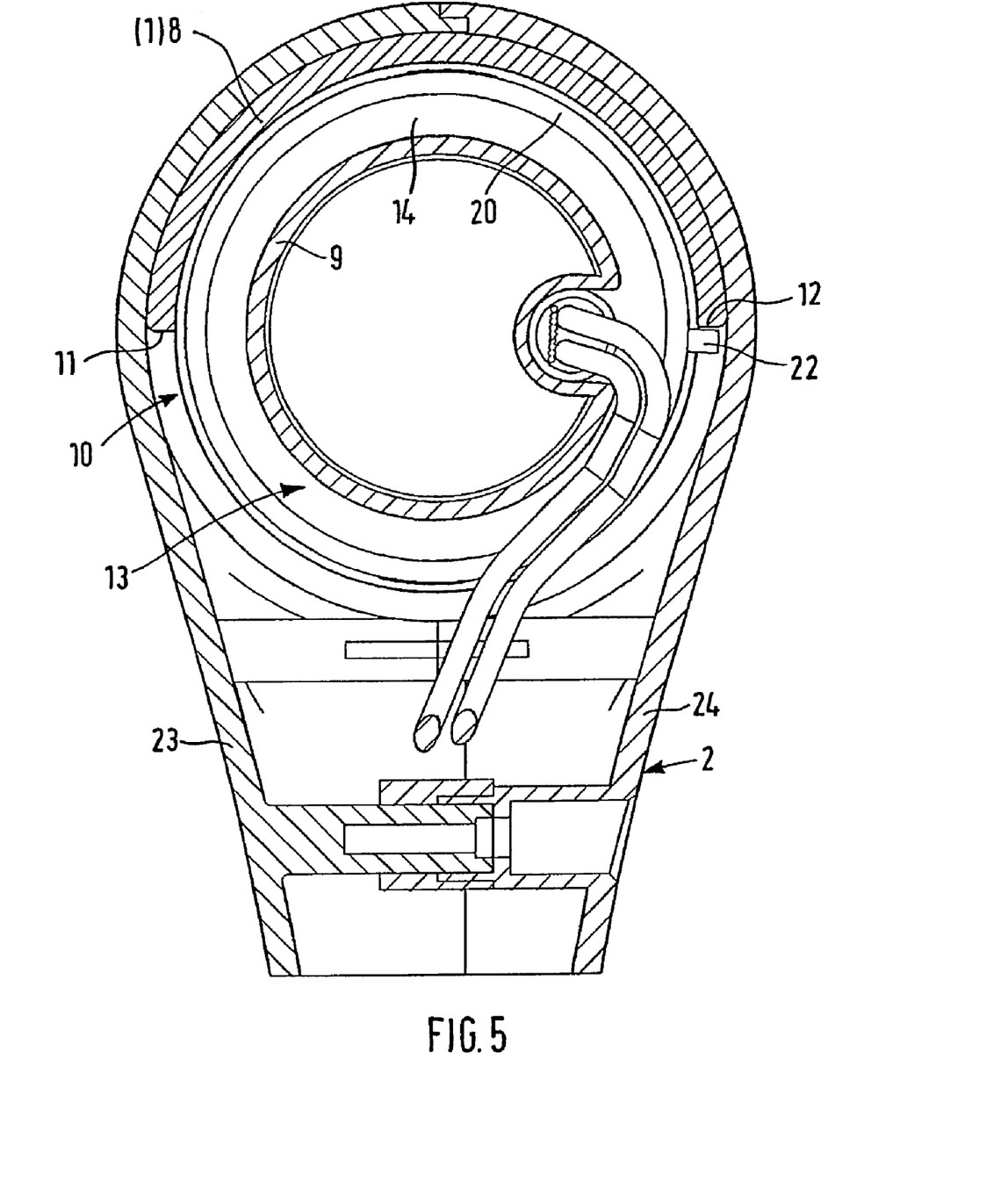
FIG. 5 shows a cross-section according to FIG. 4, but with an inner bushing which has been rotated relative to the handle tube by approximately 90° in one direction of rotation as far as the stop position.
Figure 6:
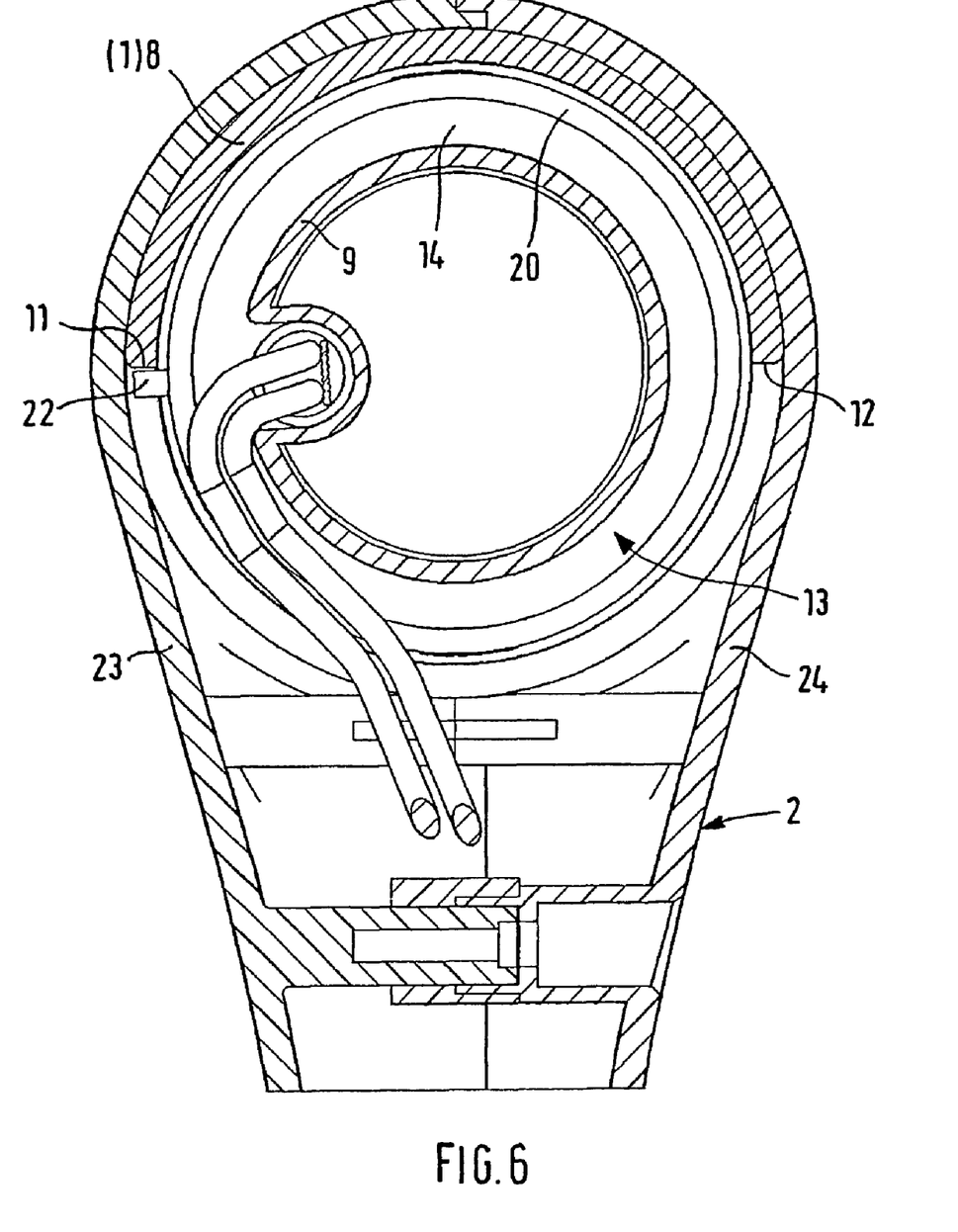
FIG. 6 shows a cross-section according to FIG. 4, but with an inner bushing which has been rotated relative to the handle tube by approximately 90° in the other direction of rotation as far as the stop position.
Figure 7:
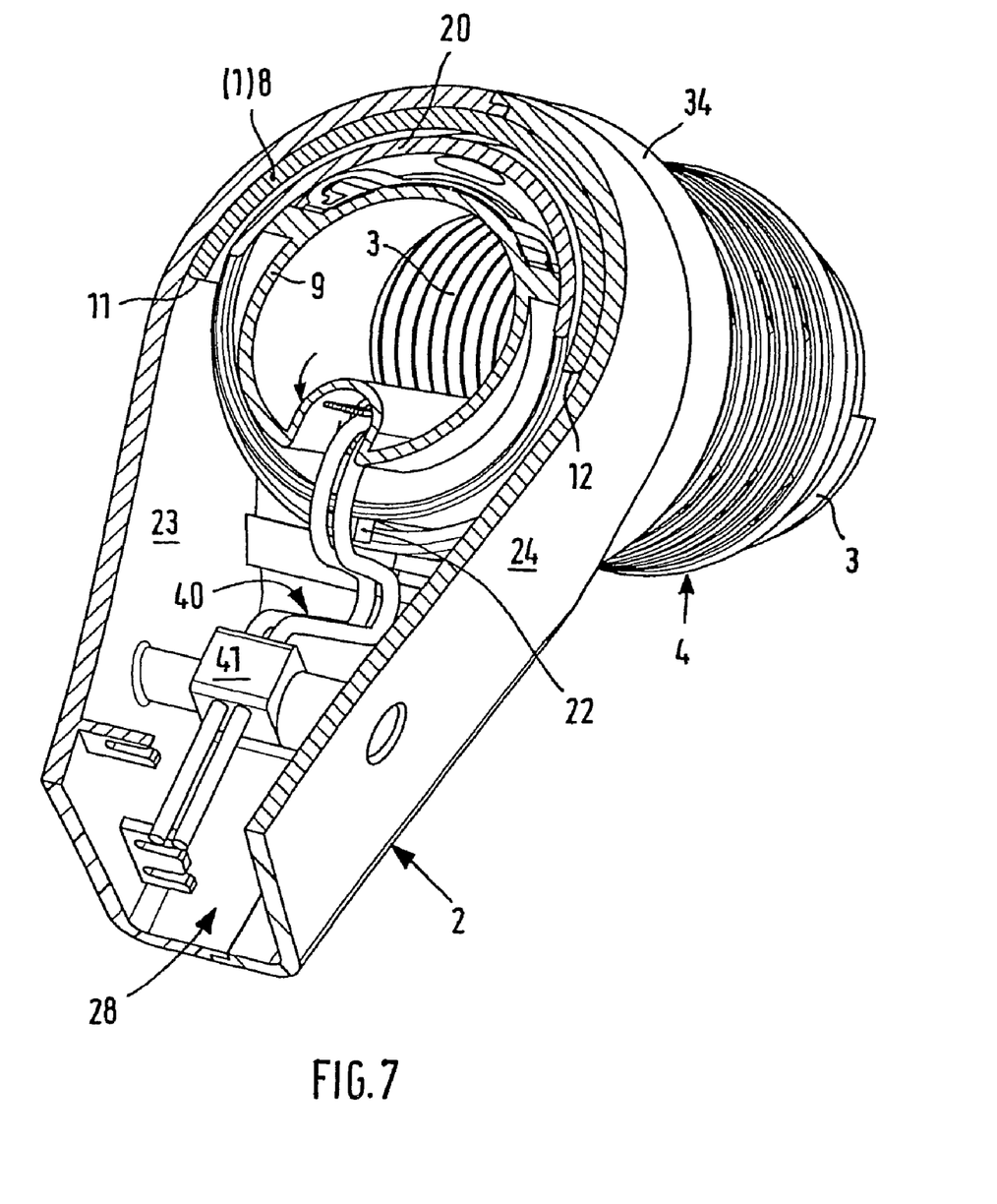
FIG. 7 shows a section through the arrangement along the angled section line VII-VII in FIG. 2.

In the case of relative rotations between the hose 3, including the parts connected in rotation therewith, and the handle tube 1, including the parts connected in rotation therewith, the electrical leads 37 are shifted from the length reserve loop 40 partially into the receiving space 13, as shown in FIGS. 5 and 6. These figures also illustrate the maximum possible rotation angle in both directions of rotation, at which the stop element 22 bears against either the end face 11 (FIG. 6) or the end face 12 (FIG. 5) of the wall opening 10.

After the cable holder 41, the electrical leads 37 are guided through the cavity 28 of the handle part 2, as can be seen from FIG. 2, and at the end of the cavity 28 can be connected in a suitable manner to leads of electrical consumers. A tension release cord 42, which is to be connected (not shown) to a tension release element 43 (FIG. 3) fitted on the inner bushing 9, is guided through the hose 3 parallel to the electrical leads 37.

As can be seen most clearly from FIG. 3, the inner bushing 9 has an annular step 44 at its end remote from the hose 3. The annular step 44 holds a lipped sealing ring 45, the sealing lip 46 of which bears against the inner wall surface 16 of the cylindrical end section 8 of the handle tube 1 and thus seals off the vacuum chamber from the external atmosphere.

The handle tube 1, the handle part 2, the anti-kink means 4 and the threaded sleeve 20 may be produced by injection molding from thermoplastic plastics of suitable strength.

In summary, a handle arrangement is proposed on a vacuum cleaner hose 3 which has corrugation peaks 18 and corrugation troughs 19 running helically around the outside in the manner of an outer thread. However, the handle arrangement can also be used for hoses on which the corrugation peaks and corrugation troughs serving for hose elasticity do not run helically on account of a different production method, but instead are arranged as alternating rings. An inner bushing 9 is attached in a suitable manner to one end of the hose 3 such that it cannot rotate relative to the hose 3, and is inserted in a handle tube 1 and fixed therein such that it can rotate but cannot be displaced in the axial direction. Electrical leads 37 are guided outwards from the hose 3 and the inner bushing 9 in a radial direction through a wall opening of the handle tube 1 and into the cavity 28 of a handle part 2. The handle part 2 is firmly connected at both ends to the handle tube 1. The electrical leads 37 are fixed so as to form a length reserve loop 40 in the cavity 28. A receiving space 13 is provided on the inner bushing 9, into which electrical leads 37 from the length reserve loop 40 are shifted when relative rotations take place between the hose 3 and the handle tube 1. The possible rotation angle is delimited by stops according to the lead length available in the length reserve loop 40.

Other variations and modifications are possible without departing from the scope and spirit of the present invention as defined by the appended claims.

We claim:

1. A handle arrangement for a vacuum cleaner hose comprising:
    electrical leads passing through the handle arrangement;
    an inner bushing which is fixedly attachable to the one end of the vacuum cleaner hose such that it cannot rotate relative to the vacuum cleaner hose;
    a handle tube, in which the inner bushing is inserted and is sealed therein and fixed such that it can rotate but cannot be displaced in the axial direction relative to the handle tube, wherein an electrical connection exists through the entire length of the electrical leads even in the case of relative rotations between the inner bushing and the handle tube, wherein
    the electrical leads are guided outwards from and the inner bushing in an approximately radial direction through a wall opening of the handle tube and into a cavity of a handle part which is connected to a hose-side end of the handle tube, wherein
    the electrical leads are fixed in the handle part so as to form a length reserve loop in the handle part, wherein
    a receiving space is provided on the outer circumference of the inner bushing, which receiving space is located adjacent the wall opening of the handle tube and into which electrical leads from the length reserve loop can be shifted in the case of relative rotations between the inner bushing and the handle tube, and wherein
    relative rotation between the inner bushing and the handle tube is delimited by stops according to the lead length in the length reserve loop.

2. A handle arrangement according to claim 1, wherein the handle part is formed of two half-shells which at one side partially tightly surround the handle tube at its hose-side end and at the other side are also connected to the other end of the handle part, wherein the two half-shells form the cavity passing through the handle part, through which cavity the electrical leads are guided and are fixed in the vicinity of the handle tube by a cable holder.

3. A handle arrangement according to claim 1, wherein the handle tube, which in the region of the inserted inner bushing is designed as a cylindrical end section, is formed in an arc shape adjacent thereto.

4. A handle arrangement according to claim 1, wherein the wall opening of the handle tube is designed as a slot-shaped cutout with end faces, the cutout passing around approximately half the circumference of the handle tube and the end faces of the cutout being arranged approximately diametrically opposite one another and said stops being defined by a stop element rotationally affixed relative to the inner bushing and protruding into the slot-shaped cutout of the handle arrangement.

5. A handle arrangement according to claim 1, wherein the receiving space on the outer circumference of the inner bushing is delimited in an axial direction by two spaced-apart flange-like annular protrusions of the inner bushing and is delimited in radial directions towards the outside by the inner wall surface of the handle tube and towards the inside by the outer circumferential surface of the inner bushing.

6. A handle arrangement according to claim 5, wherein a threaded sleeve is screwable onto a vacuum hose with corrugation peaks and corrugation troughs running helically around the outside in the manner of an outer thread, which threaded sleeve engages over an annular protrusion of said inner bushing, and said inner bushing has a stop element pointing radially outwards.

7. A handle arrangement according to claim 6, wherein the stop element of the threaded sleeve is located within the wall opening of the handle tube, wherein the two end faces of the wall opening are the stop faces for the stop element which delimit the rotation between the hose and the handle tube.

8. A handle arrangement according to claim 1, wherein the electrical leads before entering the inner bushing, are located in a tube which extends into the wall opening of the handle tube and is placed in a receiving channel of the inner bushing which extends in the axial direction and is integrally formed in the wall of the inner bushing so as to be open towards the outside.

9. A handle arrangement according to claim 5, wherein the inner bushing has at its end remote from the sleeve an annular step on which a lipped sealing ring is held, the sealing lip of which bears against the inner wall surface of the handle tube.

* * * * *

UNITED STATES PATENT AND TRADEMARK OFFICE
CERTIFICATE OF CORRECTION

| | | |
|---|---|---|
| PATENT NO. | : 8,099,830 B2 | Page 1 of 1 |
| APPLICATION NO. | : 12/220121 | |
| DATED | : January 24, 2012 | |
| INVENTOR(S) | : Georg Peter Linhart et al. | |

It is certified that error appears in the above-identified patent and that said Letters Patent is hereby corrected as shown below:

IN THE CLAIMS

Claim 1, Column 5, Line 59 - After "from", delete "and"

Signed and Sealed this
First Day of May, 2012

David J. Kappos
*Director of the United States Patent and Trademark Office*